(12) United States Patent
Iwasawa

(10) Patent No.: US 9,135,913 B2
(45) Date of Patent: Sep. 15, 2015

(54) VOICE INPUT SYSTEM, INTERACTIVE-TYPE ROBOT, VOICE INPUT METHOD, AND VOICE INPUT PROGRAM

(75) Inventor: Toru Iwasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1803 days.

(21) Appl. No.: 12/227,349

(22) PCT Filed: May 23, 2007

(86) PCT No.: PCT/JP2007/000555
§ 371 (c)(1),
(2), (4) Date: Nov. 14, 2008

(87) PCT Pub. No.: WO2007/138741
PCT Pub. Date: Dec. 6, 2007

(65) Prior Publication Data
US 2009/0099849 A1    Apr. 16, 2009

(30) Foreign Application Priority Data

May 26, 2006   (JP) ................................. 2006-146514

(51) Int. Cl.
*G10L 15/00*    (2013.01)
*G10L 21/00*    (2013.01)
(Continued)

(52) U.S. Cl.
CPC ................. *G10L 15/22* (2013.01); *G10L 25/60* (2013.01); *G10L 21/00* (2013.01)

(58) Field of Classification Search
CPC ......... G10L 15/00; G10L 15/20; G10L 15/22; G10L 15/24; G10L 15/265; G10L 21/00; G10L 21/02; G10L 21/0202; G10L 25/00; G10L 25/48; G10L 25/51; G10L 25/54; G10L 25/60; G10L 25/72; G10L 25/78; G10L 2021/00; G10L 2025/00

USPC ......... 704/226, 227, 228, 231, 233, 270, 275; 381/71.1
See application file for complete search history.

(56) References Cited

U.S. PATENT DOCUMENTS 5,548,681 A * 8/1996 Gleaves et al. ............... 704/233
6,173,266 B1 * 1/2001 Marx et al. ..................... 704/270
(Continued)

FOREIGN PATENT DOCUMENTS

JP    61-94095    5/1986
JP    7-22434     3/1995
(Continued)

OTHER PUBLICATIONS

Bauer J. WO/0139176, May 2001, Translated version.*
(Continued)

*Primary Examiner* — Paras D Shah
(74) *Attorney, Agent, or Firm* — McGinn IP Law Group, PLLC

(57) ABSTRACT

A first voice input system according to the present invention includes: a voice input unit 21, which inputs a voice, and outputs a voice signal; a condition storing unit 22, which stores a malfunction condition set including a malfunction condition element to detect a voice input state; a condition selection unit 23 by which a selection signal for selecting a malfunction condition set from a condition storing unit 22 is input from an external application 30, and a malfunction condition set corresponding to the selection signal is stored; a voice input state detection unit 24 which analyzes the voice signal, collates the analysis result and a malfunction condition element included in the malfunction condition set held by the condition selection unit 23, and output the detection result; and a response unit 25 for operation processing according to the detection result.

31 Claims, 13 Drawing Sheets

(51) Int. Cl.
*G10L 25/00* (2013.01)
*G10L 15/22* (2006.01)
*G10L 25/60* (2013.01)

(56) References Cited

U.S. PATENT DOCUMENTS

| | | | |
|---|---|---|---|
| 6,336,091 B1* | 1/2002 | Polikaitis et al. | 704/233 |
| 7,167,544 B1* | 1/2007 | Bauer | 379/88.01 |
| 7,171,357 B2* | 1/2007 | Boland | 704/231 |
| 7,243,068 B2* | 7/2007 | Barker et al. | 704/233 |
| 7,318,029 B2* | 1/2008 | Coyle et al. | 704/231 |
| 7,366,309 B2 | 4/2008 | Sato et al. | |
| 2003/0163325 A1* | 8/2003 | Maase | 704/275 |
| 2003/0220796 A1* | 11/2003 | Aoyama et al. | 704/275 |
| 2004/0059578 A1* | 3/2004 | Schulz et al. | 704/270 |
| 2004/0186715 A1* | 9/2004 | Gray et al. | 704/236 |
| 2004/0186716 A1* | 9/2004 | Morfitt et al. | 704/236 |
| 2005/0049859 A1* | 3/2005 | Arun | 704/231 |
| 2005/0131676 A1* | 6/2005 | Ghasemi et al. | 704/201 |
| 2005/0143977 A1* | 6/2005 | Malfait | 704/205 |
| 2006/0095268 A1* | 5/2006 | Yano et al. | 704/275 |
| 2006/0200345 A1* | 9/2006 | Kooiman | 704/233 |
| 2006/0252376 A1* | 11/2006 | Fok et al. | 455/67.13 |

FOREIGN PATENT DOCUMENTS

| | | |
|---|---|---|
| JP | 9-171395 | 6/1997 |
| JP | 2000-155600 | 6/2000 |
| JP | 2001-296889 | 10/2001 |
| JP | 2003-177790 | 6/2003 |
| JP | 2003-330491 | 11/2003 |
| JP | 2004-271596 | 9/2004 |
| JP | 2005-250397 | 9/2005 |
| JP | 2006-113439 | 4/2006 |
| WO | WO 0139176 A2 * | 5/2001 |

OTHER PUBLICATIONS

Kano et al., "Speech Recognition System", First Edition, p. 157-158, May 15, 2001, published by OHM Electric Inc.

* cited by examiner

FIG. 7

| CONDITION NAME | MALFUNCTION CONDITION ELEMENT |
|---|---|
| SHORTAGE IN VOICE VOLUME | MAXIMUM POWER OF INPUT VOICE IS 1000 OR LESS |
| SURROUNDING NOISE | AVERAGE POWER IN NO SOUND SECTION IS 1000 OR MORE |

FIG. 8

| CONDITION NAME | RESPONCE OPERATION |
|---|---|
| SHORTAGE IN VOICE VOLUME | SPEAKING "PLEASE SPEAK IN THE NEARER VICINITY" |
| SURROUNDING NOISE | SPEAKING "SURROUNDINGS ARE NOISY" |

FIG. 10

| MALFUNCTION CONDITION SET 1 ||
|---|---|
| CONDITION NAME | MALFUNCTION CONDITION ELEMENT |
| SHORTAGE IN VOICE VOLUME | MAXIMUM POWER OF INPUT VOICE IS 1000 OR LESS |
| SURROUNDING NOISE | MAXIMUM POWER IN NO SOUND SECTION IS 1000 OR MORE |

| MALFUNCTION CONDITION SET 2 ||
|---|---|
| CONDITION NAME | MALFUNCTION CONDITION ELEMENT |
| SHORTAGE IN VOICE VOLUME | MAXIMUM POWER OF INPUT VOICE IS 500 OR LESS |
| SURROUNDING NOISE | MAXIMUM POWER IN NO SOUND SECTION IS 500 OR MORE |

FIG. 11

| CONDITION NAME | RESPONCE OPERATION 1 (CORRESPOND TO MALFUNCTION CONDITION SET 1) | RESPONCE OPERATION 2 (CORRESPOND TO MALFUNCTION CONDITION SET 2) |
|---|---|---|
| SHORTAGE IN VOICE VOLUME | SPEAKING "PLEASE SPEAK IN THE NEARER VICINITY" | SPEAKING "PLEASE SPEAK IN THE NEARER VICINITY BECAUSE I CAN HEAR SOUNDS ONLY IN THE VICINITY" |
| SURROUNDING NOISE | SWITCHING OF VOICE INPUT GAIN TO SMALLER ONE | SPEAKING "SURROUNDINGS ARE NOISY" |

FIG. 12

| MALFUNCTION CONDITION SET 3 | | RESPONCE OPERATION 3 |
|---|---|---|
| CONDITION NAME | MALFUNCTION CONDITION ELEMENT | |
| NO ACCEPTANCE STATE OF SPEAKING | NO ACCEPTANCE STATE OF INPUT VOICE AND AVERAGE INPUT POWER OF VOICE IS 1000 OR MORE | SPEAKING "VOICE CANNOT BE INPUT NOW" |

FIG. 13

| MALFUNCTION CONDITION SET 4 | | |
|---|---|---|
| CONDITION NAME | MALFUNCTION CONDITION ELEMENT | RESPONCE OPERATION 4 |
| SHORTAGE IN VOICE VOLUME | MAXIMUM POWER OF INPUT VOICE IS 1000 OR LESS | SPEAKING "PLEASE SPEAK IN THE NEARER VICINITY" |
| SURROUNDING NOISE | MAXIMUM POWER IN NO SOUND SECTION IS 1000 OR MORE | SPEAKING "SURROUNDINGS ARE NOISY" |
| BACK SPEAKING | RESULT OF SOUND SOURCE DIRECTION DETECTION IS FROM BACK DERECTION OF INPUT ELEMENT OF VOICE INPUT CHANGE | SPEAKING "PLEASE SPEAK FROM THE FRONT BECAUSE THE NOISE CANCELLER IS WORKING" |

FIG. 14

| MALFUNCTION CONDITION SET 5 | | RESPONCE OPERATION 5 |
|---|---|---|
| CONDITION NAME | MALFUNCTION CONDITION ELEMENT | |
| SHORTAGE IN VOICE VOLUME | MAXIMUM POWER OF INPUT VOICE IS 1000 OR LESS | SPEAKING "PLEASE SPEAK IN THE NEARER VICINITY" (SPEAKING "PLEASE SPEAK FROM THE FRONT BECAUSE THE MICROPHONE ARRAY IS UNDER WORKING") |
| SURROUNDING NOISES | MAXIMUM POWER IN NO SOUND SECTION IS 1000 OR MORE | SPEAKING "SURROUNDINGS ARE NOISY" |
| DIRECTIVITY | VOICE INPUT ANGLE OBTAINED FROM SOUND-SOURCE DIRECTION DETECTION RESULT IS RIGHT AND LEFT 30 DEGREES OR MORE FROM THE FRONT OF INPUT ELEMENT OF CHANNEL FOR VOICE INPUT | SPEAKING "PLEASE SPEAK FROM THE FRONT BECAUSE THE MICROPHONE ARRAY IS UNDER WORKING" |

FIG. 15

RESPONCE OPERATION LIST CORRESPONDING TO MALFUNCTION DETECTION CONDITION SET 1

| VOICE RECOGNITION RESULT | DETECTION RESULT | RESPONCE OPERATION |
|---|---|---|
| HELLO | SHORTAGE IN VOICE VOLUME | SPEAKING "HELLO PLEASE SPEAK IN THE NEARER VICINITY" |
| | SURROUNDING NOISE | SPEAKING "HELLO THE SURROUNDINGS ARE A LITTLE NOISY" |
| | NOTHING | SPEAKING "HELLO" |
| NOTHING (REJECT) | SHORTAGE IN VOICE VOLUME | SPEAKING "PLEASE SPEAK IN THE NEARER VICINITY" |
| | SURROUNDING NOISE | SPEAKING "SURROUNDINGS ARE NOISY" |
| | NOTHING | NOTHING (NO REACTION) |

RESPONCE OPERATION LIST CORRESPONDING TO MALFUNCTION DETECTION CONDITION SET 4

| VOICE RECOGNITION RESULT | DETECTION RESULT | RESPONCE OPERATION |
|---|---|---|
| HELLO | SHORTAGE IN VOICE VOLUME | SPEAKING "HELLO, PLEASE SPEAK FROM THE FRONT BECAUSE THE NOISE CANCELER IS WORKING" (SPEAKING "PLEASE SPEAK FROM THE FRONT BECAUSE THE NOISE CANCELER IS WORKING") |
| | SURROUNDING NOISE | SPEAKING "HELLO, SURROUNDINGS ARE NOISY" |
| | BACK SPEAKING | SPEAKING "HELLO, PLEASE SPEAK FROM THE FRONT BECAUSE THE NOISE CANCELER IS WORKING" |
| | NOTHING | SPEAKING "HELLO" |
| NOTHING (REJECT) | SHORTAGE IN VOICE VOLUME | SPEAKING "PLEASE SPEAK IN THE NEARER VICINITY" |
| | SURROUNDING NOISE | SPEAKING "SURROUNDINGS ARE NOISY" |
| | BACK SPEAKING | SPEAKING "PLEASE SPEAK FROM THE FRONT BECAUSE THE NOISE CANCELER IS WORKING" |
| | NOTHING | NOTHING (NO REACTION) |

VOICE INPUT SYSTEM, INTERACTIVE-TYPE ROBOT, VOICE INPUT METHOD, AND VOICE INPUT PROGRAM

TECHNICAL FIELD

The present invention relates to a voice input system, an interactive-type robot, a voice input method, and a voice input program, and, especially, to a voice input system, an interactive-type robot, a voice input method, and a program for voice input, by which conditions to detect voice input states can be changed according to external applications, or internal states of the voice input system.

BACKGROUND ART

One example, to which a conventional voice input method is applied to voice recognition, has been described in a patent document 1. This conventional system has an object by which a user can easily specify a cause for miss-recognition, and is a system by which, when voices used for voice recognition are analyzed, and a wrong factor obstructing the recognition is detected, the detection is feed backed to a user. As a feedback method, there have been a method, by which guidance is executed for a user, and a method by which voice input is controlled by adjusting a voice input gain on the side of the system, by approaching a microphone, by noise suppression, and the like. In a patent document 2, there has been described a method in which, when there is caused a failure in voice recognition in order to feedback a malfunction of a voice input to a user, the voice, during a voice detection section in which a voice recognition engine is used, is replayed, and is given to a user.

Moreover, in a Patent Document 3, there has been described a technology for sound-source-direction detection, and the technology can be applied as a partial element of the present invention. Moreover, in a Patent Document 4, there has been described a technology for noise reduction, and the technology can be applied as a partial element of the present invention. Moreover, in the Non-Patent Document 1, there has been described a technology for voice recognition, and the technology can be applied as a partial element of the present invention.

[Patent Document 1] Japanese Laid-Open Patent Publication No. 2003-330491;

[Patent Document 2] Japanese Laid-Open Patent Publication No. S61-094095;

[Patent Document 3] Japanese Patent Publication No. H07-022434;

[Patent Document 4] Japanese Laid-Open Patent Publication No. 2005-250397;

[Non-Patent Document 1] Kano, and other four writers: "Speech Recognition System" First Edition, p. 157-158, May 15, 2001, published by OHM ELECTRIC INC.

SUMMARY

A problem in the above-described conventional technology is that conditions for detecting voice input states (malfunctions, and the like) are fixed. That is, a problem in a conventional technology is that conditions for detecting voice input states can not be changed according to states of external applications and the like.

The reason is that, when the voice input system is assumed to do setting of external applications according to a use environment, dynamic adjustment of voice input parameters according to a surrounding environment, noise suppression and the like, only state detection based on fixed conditions, and response operations at detection are not enough. For example, when there is assumed a system in which a voice input gain is changed on the side of an external application, according to use environments, or parameters are adjusted by assuming surrounding noises, there is caused a problem that a voice input gain at use can not be understood by a user.

Accordingly, such a system is required to be possible to do flexible operations, by which a present voice input state can be fed back to a user, when conditions can be set according to voice input gains and the conditions are satisfied.

An exemplary object of the present invention is to provide a voice input system, an interactive-type robot, a voice input method, and a voice input program, by which the above-described requirements are satisfied, and conditions for detecting the voice input state can be changed according to the states of external applications and the like.

According to one exemplary aspect of the invention, there is provided a first voice input system including: a voice input unit inputting a voice from one or more channels, and outputting a voice signal; a condition storing unit storing one or more malfunction condition sets including a malfunction condition element for detecting a voice input state; a condition selection unit inputting a first selection signal, by which the malfunction condition set is selected from the condition storing unit, from the external applications, and to acquire the malfunction condition set corresponding to the first selection signal from the condition storing unit for storage; a voice input state detection unit analyzing the voice signals, to generate analysis results, to collate the analysis results and the malfunction condition elements included in the malfunction condition sets held in the condition selection unit, and to output the compared results as detection results; and a response unit doing a operation processing according to the detection results.

A second voice input system according to another exemplary aspect of invention is the first voice input system, and includes: the voice input unit switching a voice-input control processing according to situations, and to output the present voice input state to the condition selection unit as a second selection signal; and the condition selection unit acquiring the malfunction condition set corresponding to the second selection signal from the condition storing unit for storage.

A third voice input system according to another exemplary aspect of invention is the second voice input system, and the voice input control processing is a voice input characteristic changing processing, or a post processing for an input voice.

A fourth voice input system according to another exemplary aspect of invention is the second voice input system, and the voice input control processing is a noise suppression processing to emphasize a target voice by suppressing voices, which are included in the voice signal, and are other than a target voice, based on the voice signal from one or more channels.

A fifth voice input system according to another exemplary aspect of invention is the first voice input system, and includes: a response storing unit storing the operation processing corresponding to the malfunction condition set stored in the condition storage unit; and a response selection unit in which the first selection signal is input, the operation processing according to the first selection signal is selected from the response storing unit and stored.

A sixth voice input system according to another exemplary aspect of invention is the second, third, or fourth voice input system, and includes: a response storing unit storing the operation processing corresponding to the malfunction condition set stored in the condition storage unit; and a response selection unit by which the first, or the second selection signal is input, and the operation processing according to the first, or the second selection signal is selected from the response storing unit and stored.

A seventh voice input system according to another exemplary aspect of invention is the second, third, fourth, or sixth voice input system, and the condition selection unit arbitrates the first selection signal from the external application and the second selection signal from the voice input unit.

An eighth voice input system according to another exemplary aspect of invention is the first, second, third, fourth, fifth, sixth, or seventh voice input system, and includes a sound-source direction detection unit by which the voice signal is input, the sound-source direction detection unit is calculated for output to the voice input state detection unit.

A ninth voice input system according to another exemplary aspect of invention is the first, second, third, fourth, fifth, sixth, seventh, eighth voice input system, and is provided with a voice recognition unit by which the voice signal is input for a voice recognition processing, and the obtained voice recognition result is output to the response unit.

A tenth voice input system according to another exemplary aspect of invention is the ninth voice input system, the voice recognition unit outputs the obtained voice recognition result to the response unit, and data on feature quantities used for voice recognition is output to the voice input state detection unit.

An interactive-type robot according to another exemplary aspect of invention includes the first, second, third, fourth, fifth, sixth, seventh, eighth, ninth, or tenth voice input system.

A first voice input method according to another exemplary aspect of invention is a voice input system in a voice input system included: a voice input unit; a condition storage unit storing one or more malfunction condition sets including a malfunction condition element for detecting of a voice input state; a condition selection unit; a voice input state detection unit; and, a response unit, wherein following procedures are included: the voice input unit inputs a voice from one or more channels, and outputs a voice signal; the condition selection unit inputs a first selection signal from an external application for selection of the malfunction condition set from the condition storing unit; and, the malfunction condition set according to the first selection signal is acquired from the condition storing unit and stored, the voice input state detection unit analyzes the voice signal, generates an analysis result, collates the analysis result, and the malfunction condition element included in the malfunction condition set holding the condition selection unit outputting of the result as a detection result, and the response unit performs a operation processing according to the detection result.

A second voice input method according to another exemplary aspect of invention is the first voice input method, and includes a procedure by which: the voice input unit switches a voice input control processing according to situations, and outputs the present voice input state as a second selection signal to the condition selection unit; and, the condition selection unit acquires the malfunction condition set according to the second selection signal from the condition storing unit and stores.

A third voice input method according to another exemplary aspect of invention is the second voice input method, and the voice input control processing is a voice input characteristic changing processing, or a post processing for the input voice.

A fourth voice input method according to another exemplary aspect of invention is the second voice input method, and the voice input control processing is a noise suppression processing by which a target voice is emphasized by suppressing voices which are included in the voice signal, and is other than a target voice, based on the voice signals from one or more channels.

The fifth voice input method according to another exemplary aspect of invention is the first voice input method, and the voice input method is to be performed in the voice input system, the voice input system including a response selection unit and a response storing unit which stores the operation processing corresponding to the malfunction condition set stored in the condition storing unit, including: the response selection unit inputs the first selection signal, selects the operation processing according to the first selection signal from the response storing unit, and stores the selected operation processing.

A sixth voice input method according to another exemplary aspect of invention is the second, third, or fourth voice input method, and the voice input method is to be performed in the voice input system, the voice input system including a response selection unit and a response storing unit which stores the operation processing corresponding to the malfunction condition set stored in the condition storing unit, including: the corresponding selection unit inputs the first or second selection signal, selects the operation processing according to the first or second selection signal from the response storing unit, and stores the selected operation processing.

A seventh voice input method according to another exemplary aspect of invention is the second, third, fourth, or sixth voice input method, and the condition selection unit includes a procedure by which the first selection signal from the external application and the second selection signal from the voice input unit are arbitrated.

An eighth voice input method according to another exemplary aspect of invention is the first, second, third, fourth, fifth, sixth, or seventh voice input method, and is a voice input method in the voice input system including a sound-source direction detection unit wherein the sound-source direction detection unit includes procedures by which the voice signal is input, and the direction of a sound source is calculated for output to the voice input state detection unit.

A ninth voice input method according to another exemplary aspect of invention is the first, second, third, fourth, fifth, sixth, or seventh voice input method, and is a voice input method in the voice input system including a voice recognition unit, wherein the voice recognition unit includes procedures by which the voice signal is input, and the obtained voice recognition result is output to the response unit.

A tenth voice input method according to another exemplary aspect of invention is the ninth voice input method, and includes a procedure by which the voice recognition unit outputs the obtained voice recognition result to the response unit, and data on feature quantities used for voice recognition is output to the voice input state detection unit.

A first voice input program according to another exemplary aspect of invention is a voice input program in a voice input system including: a voice input unit; a condition storage unit storing one or more malfunction condition sets including a malfunction condition element for detecting a voice input state; a condition selection unit; a voice input state detection unit; and a response unit, wherein the voice input unit is configured to execute a procedure by which a voice is input from one or more channels, and a voice signal is output, the condition selection unit is configured to execute a procedure by which a first selection signal to select the malfunction condition set from the condition storing unit is input from an external application, and the malfunction condition set corresponding to the first selection signal is acquired from the condition storing unit and stored, the voice input state detection unit is configured to execute a procedure by which the voice signal is analyzed, and an analysis result is generated, the analysis result, and the malfunction condition element included in the malfunction condition set held by the condition selection unit are collated, and a detection result is output, and the response unit is configured to execute a procedure by which operation processing according to the detection result is performed.

A second voice input program according to another exemplary aspect of invention is the first voice input program, wherein the voice input unit is configured to execute a procedure by which voice input control processing is switched according to situations, and the present voice input state is output to the condition selection unit as a second selection signal, and the condition selection unit is configured to execute a procedure by which the malfunction condition set corresponding to the second selection signal is acquired from the condition storing unit and stored.

A third voice input program according to another exemplary aspect of invention is the second voice input program, and the voice input control processing is a voice input characteristic changing processing, or a post processing for input voice.

A fourth voice input program according to another exemplary aspect of invention is second voice input program, and the voice input control processing is a noise suppression processing by which a target voice is emphasized by suppressing voices, which are included in the voice signal, and is other than a target voice, based on the voice signals from one or more channels.

A fifth voice input program according to another exemplary aspect of invention is the first voice input program, and is the voice input program is to be performed in the voice input system, the voice input system including a response selection unit and a response storing unit which stores the operation processing corresponding to the malfunction condition set stored in the condition storing unit, and wherein the program makes the response selection unit execute processes of inputting the first selection signal, selecting the operation processing according to the first selection signal from the response storing unit, and storing the selected operation processing.

A sixth voice input program according to another exemplary aspect of invention is the second, third, or fourth voice input program, and is the voice input program is to be performed in the voice input system, the voice input system including a response selection unit and a response storing unit which stores the operation processing corresponding to the malfunction condition set stored in the condition storing unit, and wherein the voice input program makes the corresponding selection unit execute processes of inputting the first or second selection signal, selecting the operation processing according to the first or second selection signal from the corresponding storing unit, and storing the selected operation processing.

A seventh voice input program according to another exemplary aspect of invention is the second, third, fourth, or sixth voice input program, and the condition selection unit is configured to execute a procedure for arbitration between the first selection signal from the external application, and the second selection signal from the voice input unit.

An eighth voice input program according to another exemplary aspect of invention is the first, second, third, fourth, fifth, sixth, or seventh voice input program, and is a voice input program in the voice input system including a sound-source direction detection unit wherein the sound-source direction detection unit is configured to execute a procedure by which the voice signal is input, and the sound-source direction is calculated, and is output to the voice input state detection unit.

A ninth voice input program according to another exemplary aspect of invention is the first, second, third, fourth, fifth, sixth, seventh, or eighth voice input program, and is a voice input program in the voice input system including a voice recognition unit, wherein the voice recognition unit is configured to execute a procedure by which the voice signal is input, voice recognition is processed, and the obtained voice recognition result is output to the response unit.

A tenth voice input program according to another exemplary aspect of invention is the ninth voice input program, and the voice recognition unit is configured to execute a procedure by which the obtained voice recognition result is output to the response unit, and data on feature quantities used for voice recognition is output to the voice input state detection unit.

The effect of the present invention is that conditions for detecting a voice input state can be dynamically switched according to states of external applications and the like.

The reason is that there is a configuration in which one or more conditions (malfunction condition set) for detecting a voice input state are stored, and the conditions are switched by an instruction from an external application.

BRIEF DESCRIPTION OF THE DRAWINGS

The above-described and other objects, features and advantages will become further clear from the following description of the exemplary embodiments taken in conjunction with the accompanying drawings.

FIG. 7 is an explanatory drawing showing an example of a malfunction condition sets;

FIG. 8 is an explanatory drawing showing an example of response operation lists;

FIG. 10 shows explanatory drawings showing an example of a malfunction condition set in the first example;

FIG. 11 is an explanatory drawing showing an example of response operation lists in a third example;

FIG. 12 is an explanatory drawing showing another example of malfunction condition sets and response operation lists in the third example;

FIG. 13 is an explanatory drawing showing an example of malfunction condition sets and response operation lists in the fourth example;

FIG. 14 is an explanatory drawing showing other examples of malfunction condition sets and response operation lists in the fourth example; and FIG. 15 shows explanatory drawings showing list examples representing relations between voice recognition results, detection results, and response operations in the fifth execution example.

EXEMPLARY EMBODIMENT

Figure 1:
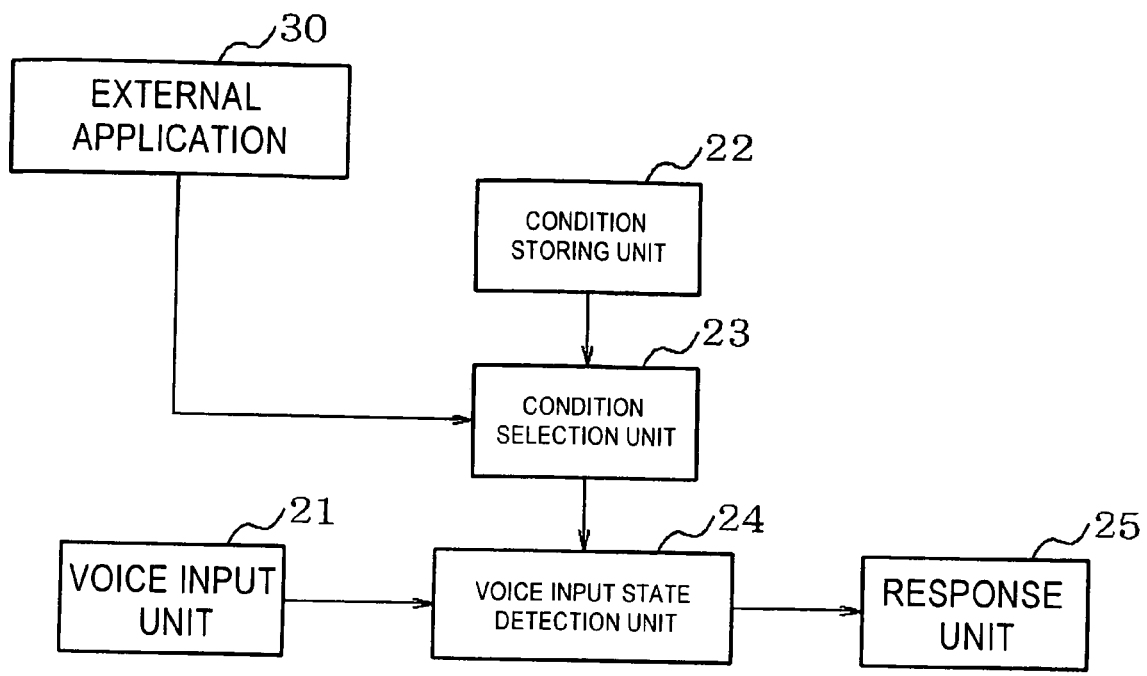
FIG. 1 is a block diagram showing a configuration according to a first exemplary embodiment.

Then, exemplary embodiments for carrying out the present invention will be explained in detail, referring to the drawings.

FIG. 1 is a block diagram showing a configuration according to the first exemplary embodiment.

Referring to FIG. 1, the first exemplary embodiment includes: a voice input unit 21; a condition storing unit 22; a condition selection unit 23; a voice input state detection unit 24, a response unit 25, and an external application 30.

The voice input unit 21 inputs voices from one or more channels and outputs voice signals. The condition storing unit 22 holds one or more malfunction condition sets including one or more malfunction condition elements to detect a voice input state. The condition selection unit 23 inputs a selection signal for selecting a malfunction condition set in the condition storing unit 22 from the external application 30, and acquires a malfunction condition set according to the selection signal from the condition storing unit 22 and store. The voice input state detection unit 24 analyzes a voice signal, collates the analyzed result and the malfunction condition elements included in the malfunction condition set held by the condition selection unit 23 to output a collation result. The response unit 25 performs an operation processing according to the collation result.

The voice input unit 21 includes, for example, hardware. The condition storing unit 22 includes, for example, memories and the like. The condition selection unit 23, and the voice input state detection unit 24 include, for example, combinations of hardware and software. For example, an internal application program realizing the function of the condition selection unit 23, and that of the voice input state detection unit 24 operates on a processor. Here, the internal application programs are stored in memories and the like. When the internal application program is executed, a hardware element (for example, an operation circuit) in the processor operates. The response unit 25 includes, for example, combinations of hardware and software. The external application 30 is, for example, one kind of the application programs, and operates on a processor.

Then, operations of a first exemplary embodiment will be explained, referring to drawings.

Figure 2:
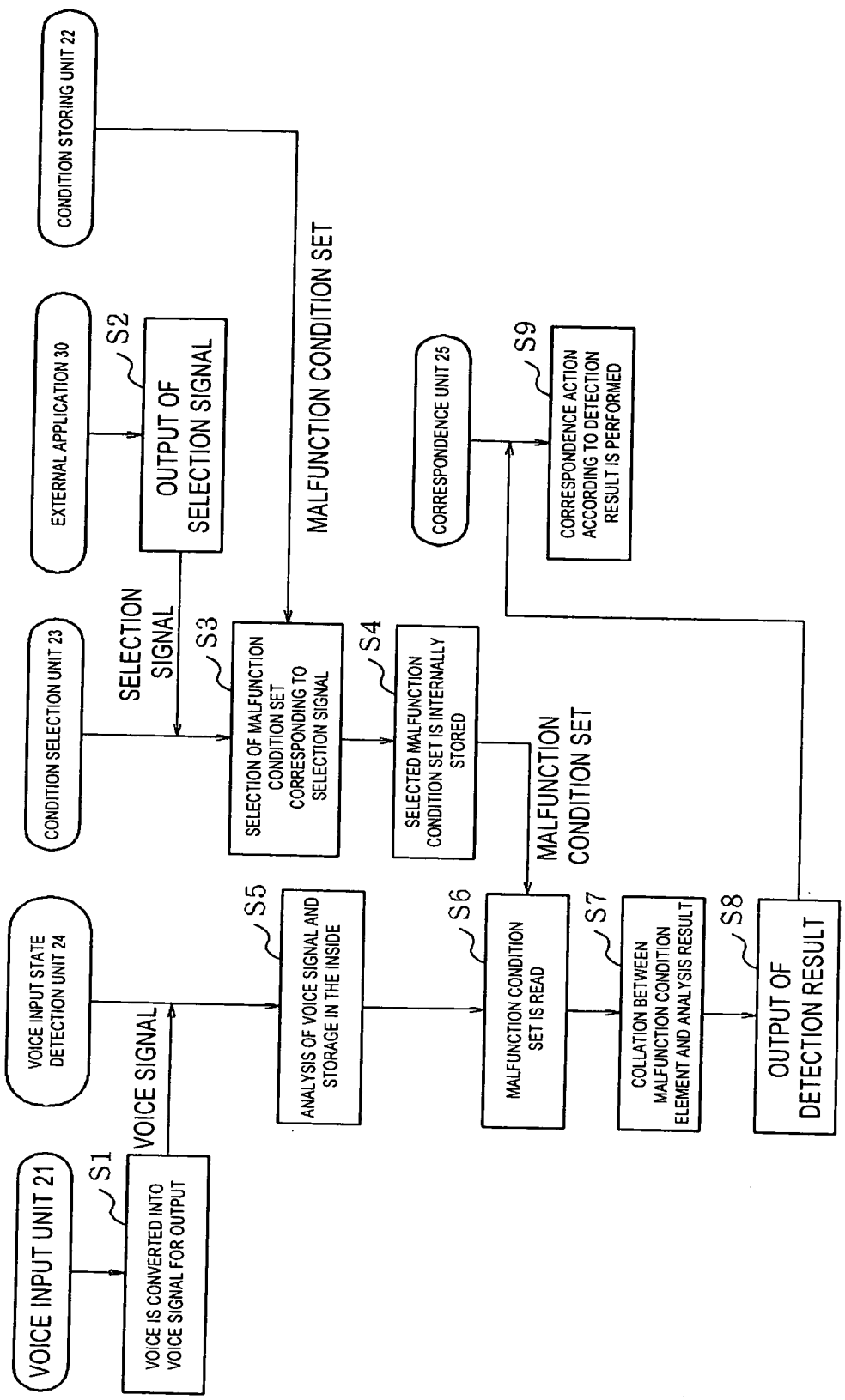
FIG. 2 is a flowchart showing operations according to the first exemplary embodiment.

FIG. 2 is a flowchart showing the operation of the first exemplary embodiment.

Referring to FIG. 2, the voice input unit 21 inputs a voice, converts it to a voice signal (for example, a digital voice data), and outputs (step S1) the signal to the voice input state detection unit 24. The condition storing unit 22 holds one or more malfunction condition sets including one or more pairs of condition names and malfunction condition elements, shown in the example presented in FIG. 7. The external application 30 outputs (step S2) a selection signal to the condition selection unit 23. The condition selection unit 23 selects a malfunction condition set, corresponding to the selection signal from the external application 30, from the inside of the condition storing unit 22 (step S3). And the set is stored in the inside of the set itself (step S4). The voice input state detection unit 24 inputs the voice signal from the voice input unit 21, analyzes the voice signal, and stores the analyzed result in the inside of itself (step S5). Moreover, the voice input state detection unit 24 reads the malfunction condition set stored in the condition selection unit 23 (step S6). Then, the voice input state detection unit 24 collates the malfunction condition element included in the read malfunction condition set and the analysis result of the voice signal (step S7), and the condition name of a malfunction condition element satisfied by the analysis result is output to the response unit 25 as a detection result (step S8).

The response unit 25 holds response operation lists including pairs of condition names and response operations, as shown in an example of FIG. 8. The response unit 25 inputs a detection result from the voice input state detection unit 24, and performs a response operation according to the detection result (step S9). Here, the condition name of the response operation list includes a condition name included in the malfunction condition set. Moreover, the number of the condition names output as a detection result is not always limited to one, and the number may be zero, or a plural. The response unit 25 does not execute the response operation when the number of condition names output as a detection result is zero. When the number of the condition names output as detection results are plural, the response unit 25 performs response operations for detection results with a higher priority level, or, response operations according to plural results, based on the priority of the detection result set beforehand.

In the first exemplary embodiment, as the condition selection unit 23 is configured to select a malfunction condition set stored in the condition storing unit 22, the malfunction condition set can be used, based on requirements from the external application 30.

Figure 3:
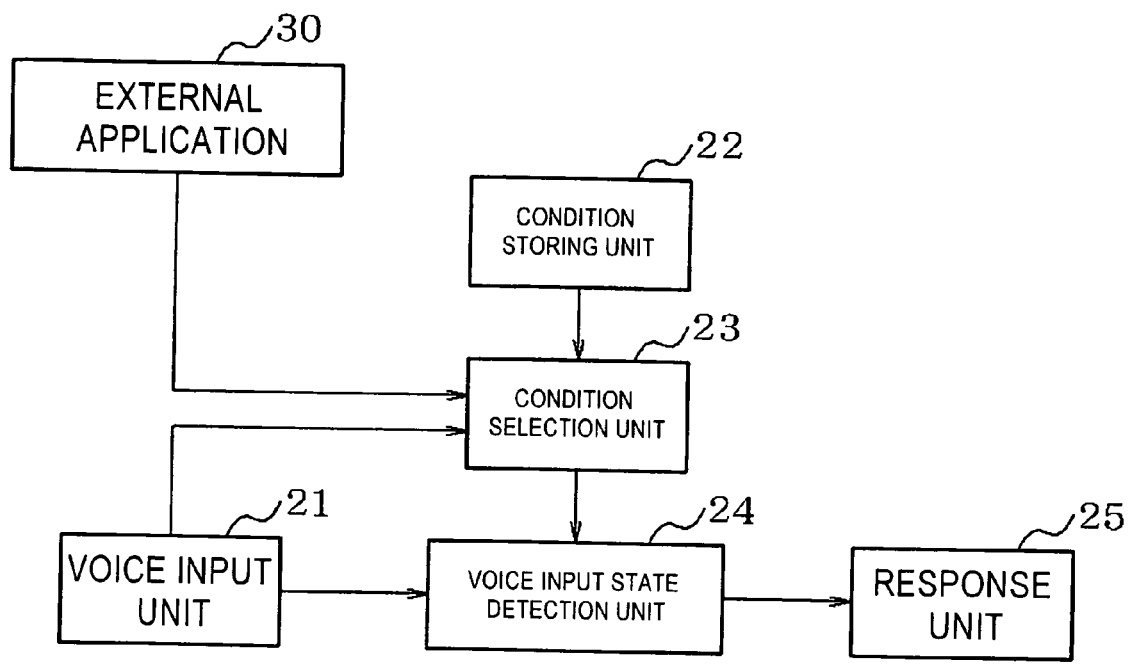
FIG. 3 is a block diagram showing a configuration according to a second exemplary embodiment.

Then, the second exemplary embodiment will be explained in detail, referring to drawings. FIG. 3 is a block diagram showing the configuration of the second exemplary embodiment.

Referring to FIG. 3, a second exemplary embodiment is characterized in that the voice input unit 21 further includes a voice input switching function by which voice input processing is switched according to situations, and a function by which the present voice input state is output to the condition selection unit 23 as a second selection signal.

The voice input switching function is a function by which the voice input unit 21 switches the voice input processing which can be controlled. An example of a voice input processing which can be controlled includes a voice input characteristic changing processing, or a post processing for input voice. Examples for changing processing in a voice input characteristic includes a changing processing in voice input gains and pass frequency bands, a changing processing of a used channel when a plurality of voice input channels are used, and the like. As a post processing example, there are listed no-sound-section noise suppression by whitening of voices, voice directivity emphasis with a microphone array, and the like. Here, the voice input state means a voice input processing which the voice input unit 21 is using now.

Figure 9:
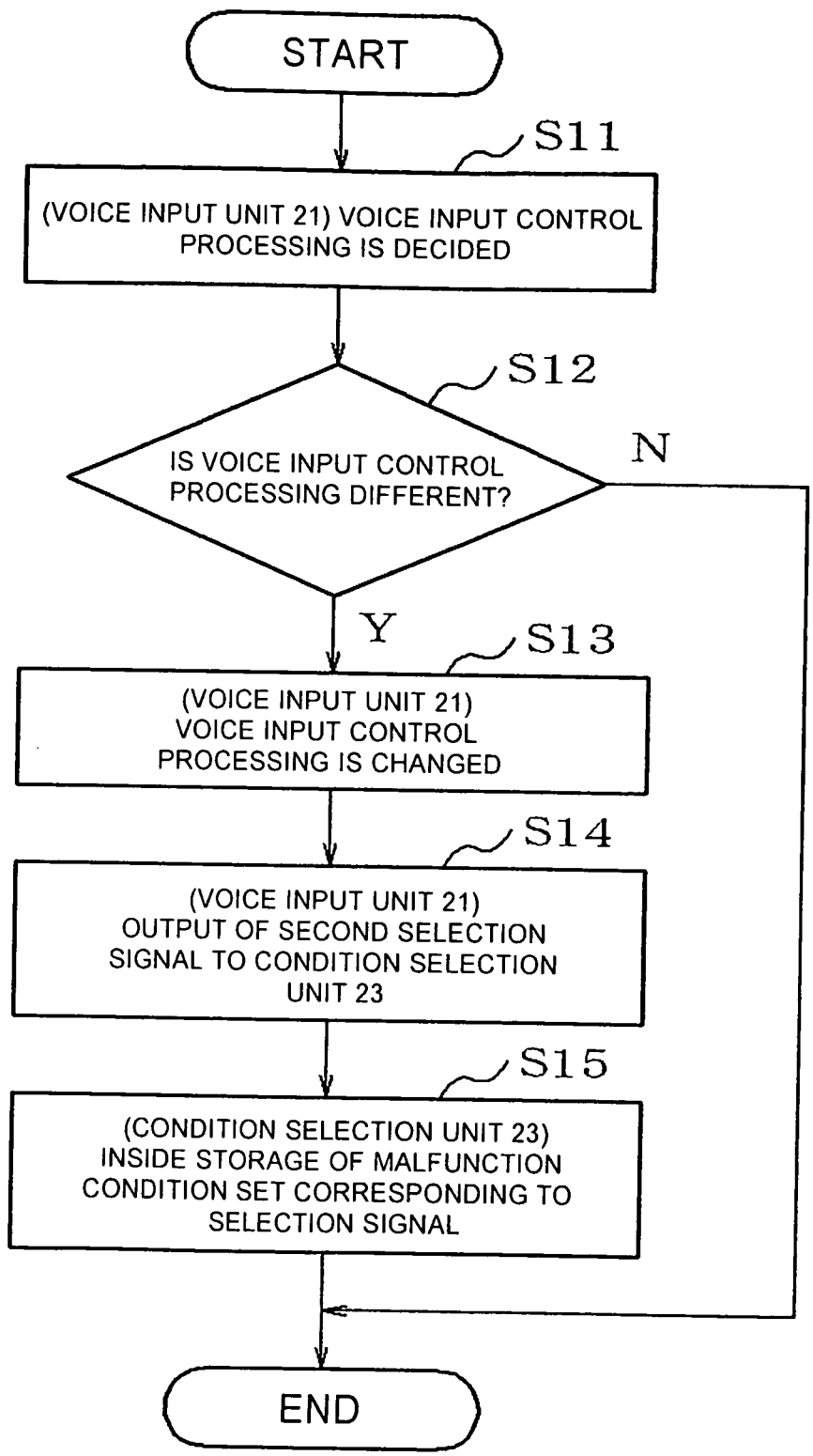
FIG. 9 is a flowchart showing operations according to the second exemplary embodiment.

There will be explained operations for a case in which the voice input unit 21 analyzes the input voice for itself, and outputs a selection signal to the condition selection unit 23, referring to a flowchart shown in FIG. 9. In the first place, the voice input unit 21 analyzes input voices (voices converted into digital signals are allowable), and, the voice input processing is decided, based on the result (step S11). Then, the voice input unit 21 judges whether the voice input processing is different from the voice input processing used last time (step S12).

When the voice input processing is different from the voice input processing used last time (step S12/Y), the voice input unit 21 changes the voice input processing which is used by use of a voice input switching function to the voice input processing decided at this time (step S13). Moreover, the voice input unit 21 outputs the second selection signal to the condition selection unit 23 (step S14). When the condition selection unit 23 inputs the second selection signal from the voice input unit 21, the malfunction condition set according to the selection signal is acquired from the condition storing unit 22, and is stored in the inside of itself (step S15).

In the second exemplary embodiment, the voice input unit 21 itself analyzes the voice input state, and switches the voice input processing. In that case, as the voice input unit 21 transmits a second selection signal showing a voice input control processing in current use to the condition selection unit 23, a malfunction condition set responding to the voice input control processing in current use by the voice input unit 21 is collated with the analysis result of the voice signal. The voice input control processing, which is finally used by the voice input unit 21, is reflected on the response operation by the response unit 25.

In the condition selection unit 23, there will be considered a case in which there is also required arbitration between a selection signal from the external application 30, and a second selection signal from the voice input unit 21. The arbitration recited here means that, when a malfunction condition set A has been selected by a selection signal from the external application 30, and when a second selection signal selecting a malfunction condition set B from the voice input unit 21 is sent, either of a malfunction condition set of A, or that of B is selected by the arbitration.

Figure 4:
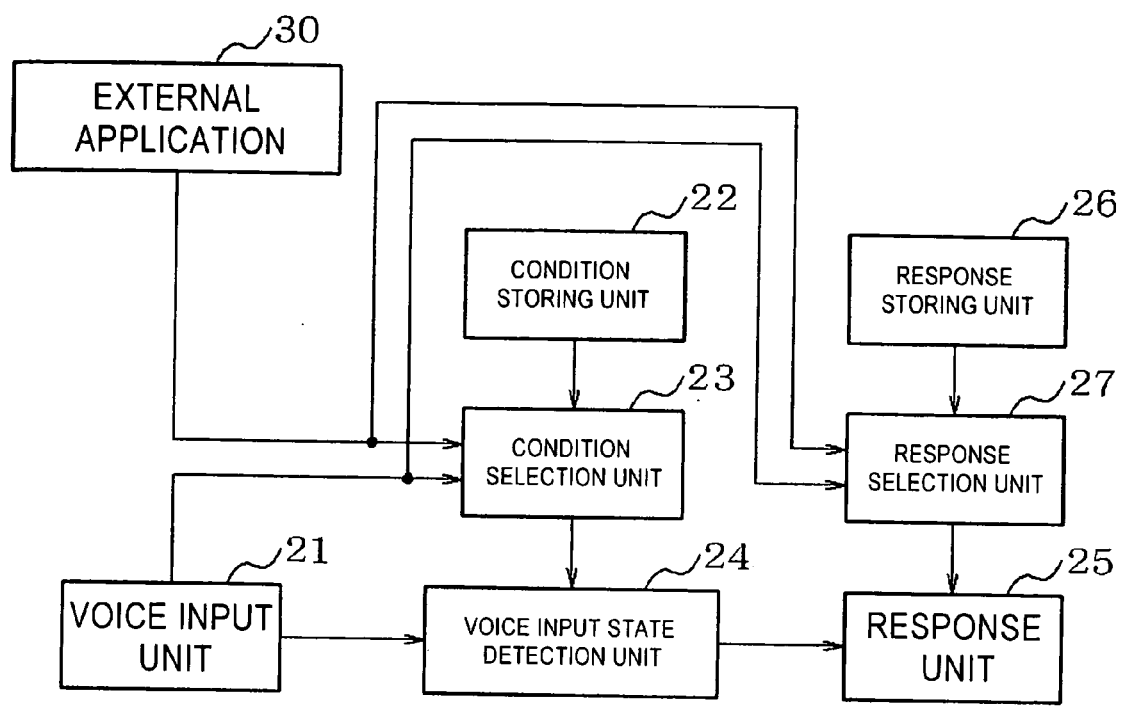
FIG. 4 is a block diagram showing a configuration according to a third exemplary embodiment.

Then, a third exemplary embodiment will be explained in detail, referring to drawings. FIG. 4 is a block diagram showing the configuration of the third exemplary embodiment.

Referring to FIG. 4, the third exemplary embodiment includes, in addition to the first, or the second exemplary embodiment, a response storing unit 26 storing a response operation corresponding to a malfunction condition set stored in the condition storing unit 22, and a response selection unit 27 by which a selection signal, or a second selection signal is input, a response operation according to the selection signal, or the second selection signal is selected from the response storing unit 26, and the operation is stored in the inside of itself.

The response storing unit 26 holds response operation lists corresponding to each of malfunction condition lists stored in the condition storing unit 22. The response selection unit 27 receives a selection signal representing the present voice input control processing from any of the external application 30, the voice input unit 21, and the condition selection unit 23, and acquires response operation lists (refer to FIG. 11) responding to a selection signal from the response storing unit 26 for storage in itself. The response unit 25 decides a response operation, based on the response operation list stored in the response selection unit 27.

The third exemplary embodiment can be configured to respond to a case in which not only a malfunction condition set, but also a response operation is changed, by switching the voice input control processing.

Figure 5:
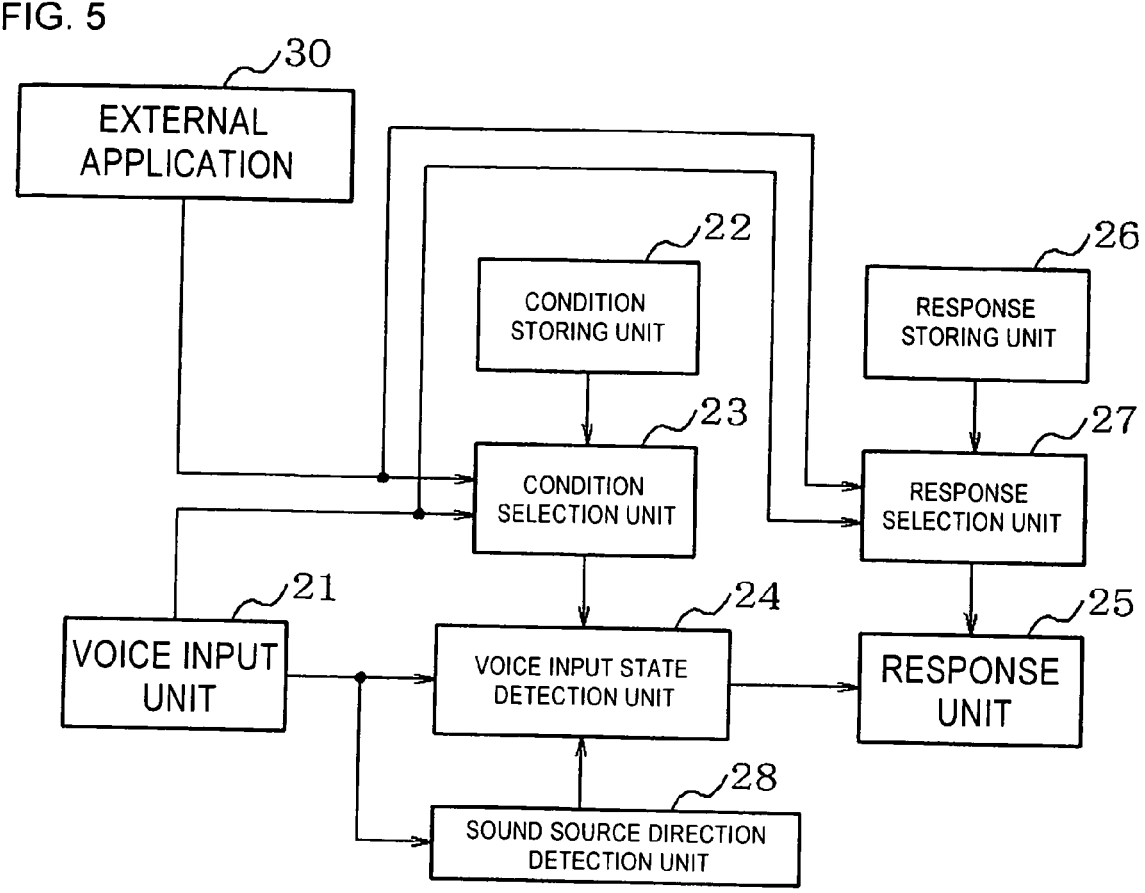
FIG. 5 is a block diagram showing a configuration according to a fourth exemplary embodiment.

Then, the fourth exemplary embodiment will be explained in detail, referring to drawings. FIG. 5 is a block diagram showing the configuration according to the fourth exemplary embodiment.

When FIG. 5 is referred to, the fourth exemplary embodiment, in addition to the first, second or third exemplary embodiment, includes a sound-source-direction detection unit 28 by which a voice signal output from the voice input unit 21 is input, and the sound-source direction is calculated and is output to the voice input state detection unit 24.

The fourth exemplary embodiment has a configuration in which, in order to detect the sound-source direction, the voice input unit 21 is equipped with two or more voice input channels. The sound-source-direction detection unit 28 inputs a voice signal output by the voice input unit 21, estimates the sound-source direction from correlation among input voice signals of a plurality of channels, and outputs the estimated result of the sound-source direction to the voice input state detection unit 24. The voice input state detection unit 24 analyzes the voice signal, based on the voice signal from the voice input unit 21, and the estimated result of the sound-source direction input from the sound-source-direction detection unit 28. For example, a technology described in "Patent Document 3" can be applied to the configuration of the sound-source direction detection unit 28.

The fourth exemplary embodiment can analyze a voice signal in a suited manner for the voice input direction and in a more highly developed manner by using a plurality of voice input channels.

Figure 6:
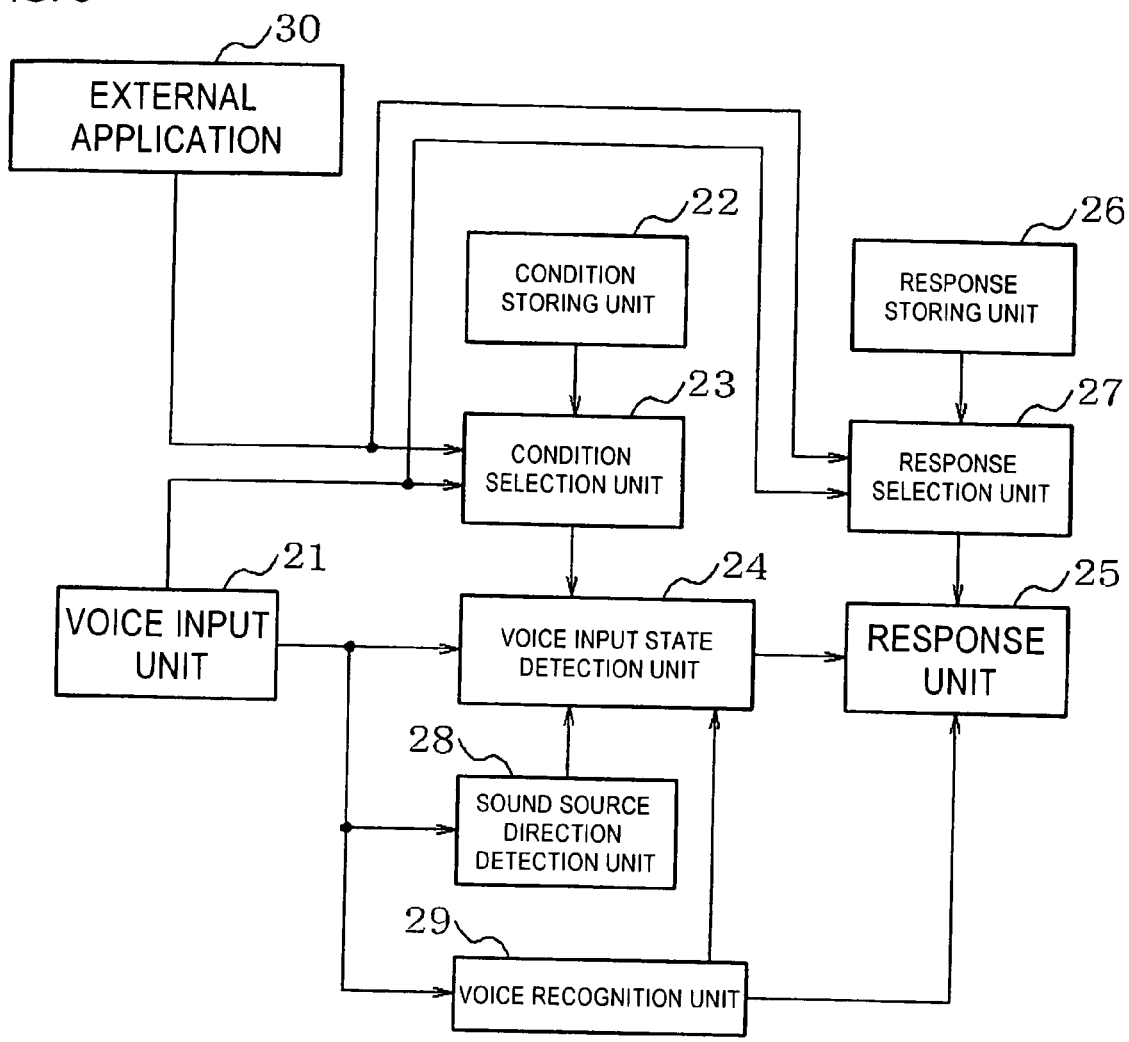
FIG. 6 is a block diagram showing a configuration according to a fifth exemplary embodiment.

Then, a fifth exemplary embodiment will be explained in detail, referring to drawings. FIG. 6 is a block diagram showing the configuration according to the fifth exemplary embodiment.

Referring to FIG. 6, in addition to of the first, second, third, or fourth exemplary embodiment, the fifth exemplary embodiment includes a voice recognition unit 29 by which a voice signal output from the voice input unit 21 is input, the voice recognition processing is executed, and the voice recognition result is output to the response unit 25. For example, a technology described in "Non-Patent Document 1" can be applied to the configuration of the voice recognition unit 29.

The voice recognition unit 29 receives the voice signal output from the voice input unit 21, and performs a recognition processing. Then, the obtained voice recognition result (reject when a result is not obtained) is out put to the response unit 25. The response unit 25 decides a response operation, based on the voice recognition result and the collation result, which have been delivered.

As it is general that the voice recognition result from the voice recognition unit 29 and the detection result from the voice input state detection unit 24 are asynchronously output, both the results are required to be synchronized when a response operation in the response unit 25 is decided. As a synchronization method, there is considered, for example, a method in which, when the response unit 25 inputs the voice recognition result, a detection result and a voice recognition result, which have been input immediately before, are integrated to output a response operation.

Moreover, the voice recognition unit 29 can use malfunction condition elements corresponding to feature quantities (a malfunction condition set including a malfunction condition element corresponding to the feature quantities is required to be stored in the condition storing unit 22) by outputting the voice recognition result to the response unit 25, and, at the same time, by outputting data, such as feature quantities which have been used for voice recognition, to the voice input state detection unit 24. An example of data such as feature quantities includes, for example, information, which has been used in the voice recognition unit 29, on a voice detection section, and an analysis result (whether there is included a voice like a human voice in a section during which a voice is detected, and the like) in a voice detection section.

EXAMPLES

Then, operations in best mode for carrying out the exemplary embodiments will be explained, using specific examples.

In the first place, an example (first example) according to the first exemplary embodiment will be explained. In the first example, two values of "larger" and "smaller" values can be set as a voice input gain of the voice input unit 21. And the condition selection unit 23 switches the malfunction condition set according to the above two values. FIG. 10 shows explanatory drawings expressing example of malfunction condition sets. As each of the malfunction condition elements is an example, the description is simply described.

Referring to FIG. 10, a shortage condition in a voice volume is satisfied when the power of a voice input in a certain fixed time is equal to, or smaller than a certain threshold, and, as for surrounding noises, the condition is satisfied when the average power in a voice section, which, from the view point of the system, is assumed to be no sound section, is equal to, or larger than a certain threshold. In the examples for the response operation, there have been described examples in which speaking for guidance is made. For example, when the shortage condition in a voice volume is detected, the speaking for guidance is "Please, speak in the nearer vicinity", and, when surrounding noises are detected, the speaking is "surroundings are noisy". As a method for speaking for guidance, speeches which have been recorded beforehand may be replayed, or voices using a Text to Speech (TTS) technology may be synthesized.

Here, a response operation for a case in which a plurality of conditions are satisfied can be also executed, though there has not been described in the malfunction condition set in FIG. 10. For example, when a shortage in a voice volume, and a surrounding noise are detected at the same time, there can be a method in which speaking for more detailed guidance can be performed by adding an entry for guidance such as a condition name of "shortage in voice volume+surrounding noise", and a response operation of "please speak in the nearer vicinity because surroundings are noisy".

When a malfunction condition set 1 is a "larger" input gain in the examples shown in FIG. 10, a malfunction condition set 2 is a detection condition for a case in which the input gain is "smaller". A different point between the both cases is a point that a threshold for the maximum power of the voice-volume shortage condition and that for the average power of the surrounding noise condition are different from each other (the threshold of the malfunction condition set 2 is a half of the value of the malfunction condition set 1). Switching among malfunction condition sets is made by a configuration in which control of the condition selection unit 23 is made by the external application 30.

The external application 30 transmits a selection signal showing the present state of the voice input gain to the condition selection unit 23. When the condition selection unit 23 refers to the selection signal, and the voice input gain is "larger", the malfunction condition set 1 is acquired from the condition storing unit 22 for storage in the inside, and, when the gain is "smaller", the malfunction condition set 2 is acquired from the condition storing unit 22 for storage in the inside. Moreover, there can be a configuration in which the external application 30 decides "larger", or "smaller" of the voice input gain of the voice input unit 21.

Then, there will be explained the example (second example) according to the second exemplary embodiment. The second example uses the first example, and the voice input unit 21 switches "larger" and "smaller" of the voice input gain according to the surrounding situations. In the system according to the second example, the voice input gain is assumed to be "larger" for easier collection of voices in the case of usual situations (at starting), and, in situations in which there are excessive surrounding noises, the voice input gain is made "smaller" and the system works in such a way that the influences from the surrounding noises are reduced.

The voice input unit 21 is started at starting time with the "larger" voice input gain, and, at the same time, a second selection signal showing the "larger" voice input gain to the condition selection unit 23 is output to the condition selection unit 23 in such a way that the malfunction condition set 1 is stored in the condition selection unit 23. Then, when the malfunction condition element of a surrounding noise is satisfied, the voice input unit 21 uses the voice input switching function included in itself, switches the voice input gain to "smaller", transmits the second selection signal showing the "smaller" voice input gain to the condition selection unit 23, and operates in such a way that the malfunction condition set 2 is applied.

Then, when it is judged that a state in which there are excessive surrounding noises has been avoided by some situations (a predetermined time has passed, for example, after detecting the surrounding noises), the voice input gain is switched to the "larger" one again, and, at the same time, the condition selection unit 23 is configured to store the malfunction condition set 1.

Then, arbitration of the selection signals in the second exemplary embodiment will be explained, using examples. Various kinds of methods are considered as an arbitration method. For example, the following methods are considered: (1) a method determining a priority level for a selection signal, and a second selection signal (in the above-described example, which of the external application 30 and the voice input unit 21 has a priority), and (2) a method by which a malfunction condition set is selected according to the state of a selection signal as an arbitration target.

In the method of (2), the condition selection unit 23 is configured to memorize which of a selection signal and a second selection signal has selected the last-minute malfunction condition set, and a newly input selection signal, or a second selection signal are combined to select a new malfunction condition set. There will be explained, for example, a case in which a malfunction condition set selected immediately before is by the second selection signal from the voice input unit 21, and a new selection signal is input from the external application 30. In this case, the condition selection unit 23 selects a malfunction condition set corresponding to both a selection signal and a second selection signal, and the set is different from the malfunction condition set corresponding to a selection signal and each of second selection signals.

As for the malfunction condition set corresponding to both a selection signal and a second selection signal, there are considered a method in which a malfunction condition set for a selection signal (or, the second selection signal) input immediately before, and a selection signal newly input (or, the second selection signal) is defined beforehand, and selected, and a method in which a malfunction condition set selected by an individual selection signal (or, the second selection signal) is merged. As one of the methods merging the malfunction condition sets, only the malfunction condition elements not included in the malfunction condition set which has been selected now are merged from a new malfunction condition set.

For example, when only the malfunction condition element of "surrounding noise" is included in the present malfunction condition set, and, when there is a malfunction condition element of "voice-volume shortage" in the malfunction condition set selected by a new selection signal (or, a second selecting signal), there is considered a method by which a malfunction condition set having malfunction condition elements of "surrounding noise" and "voice-volume shortage" is generated by merging the both elements.

Then, there will be explained the example (third example) according to the third exemplary embodiment. In the third example, the response operations to the malfunction condition sets 1 and 2 are added to the second example, and each of the response operations is switched. FIG. 11 is an explanatory drawing showing a response operation list corresponding to each of the malfunction condition set 1, and the malfunction condition set 2, respectively. Referring to FIG. 11, the response operation 1 is a response operation corresponding to a state of a "larger" voice input gain, and the response operation 2 is a response operation corresponding to a state of a "smaller" voice input gain.

The voice input unit 21 is operated in such a way that, at starting, a selection signal showing a "larger" voice input gain is transmitted to the condition selection unit 23 and the response selection unit 27, and the malfunction condition set 1 and the response operation 1 are stored in each unit, respectively. Then, when a state corresponding to a malfunction condition element of "surrounding noise" is detected, the voice input unit 21 operates in such a way that the voice input gain is switched to "smaller", the condition selection unit 23 stores the malfunction condition set 2, and the response selection unit 27 stores the response operation 2.

By the above-described operations of the voice input unit 21, the response operation when each of the malfunction condition elements is satisfied can be more suitably applicable to the present system state. Referring to FIG. 11, when a condition for "voice-volume shortage" is detected, it is usual that speaking "please speak in the nearer vicinity" is simply made for guidance, and, on the other hand, when the voice input gain is "smaller", a configuration in which the voice input gain has been switched to "smaller" can be transmitted to a user by speaking "Please, speak in the nearer vicinity, because I can hear sounds only in the vicinity".

Moreover, when a condition for "surrounding noise" is detected, speaking "surroundings are noisy" is simply given to a user in the case in which the voice input gain is "smaller". On the other hand, in the case in which the voice input gain is "larger", the voice input gain is automatically switched to "smaller", the response operation, by which the malfunction state is actively avoided, can be performed on the side of the system, not by a guidance to a user.

As other application examples for the response selection unit 27, there is considered an example in which there are mixed a case accepting a voice input, and a case not accepting it (for example, in the case of voice recognition of input voices, there are limited situations in which voice recognition can be performed). FIG. 12 shows a malfunction condition set 3 and a response operation, which are used by this application example.

The malfunction condition set 3 is used for detecting a speaking state for no voice-input acceptance (condition name: "Speaking for No Acceptance State"). The voice input unit 21 outputs a voice signal to the voice-input-state detection unit 24, and, at the same time, a value representing a voice-input acceptance state (a voice input is accepted, or is not accepted) is output to the voice input state detection unit 24. The external application 30 may give the voice input state to the voice-input-state detection unit 24.

When there is a state in which a voice input is not accepted, and, when it is detected that the average power exceeds 1000 (by analysis of a voice signal), the voice input state detection unit 24 is controlled to detect a condition for "speaking for no acceptance state", and to make speaking for guidance "voice cannot be input now". A state in which no voice input is accepted can be notified to a user by speaking "voice cannot be input now".

Then, there will be explained an example (fourth example) according to the fourth exemplary embodiment. The fourth example is an example in which a noise suppression processing and the sound-source-direction detection are synchronized. In the first place, noise suppression by two-channel input noise canceler is assumed as an example of a noise suppression processing in the fourth example. In this noise suppression method, the voice input unit 21 includes channels for voice input and channels for noise input, and noise suppression is made by assuming surrounding noises from correlation between input voices of both channels, and by subtracting surrounding noises from the input voices through voice input channels (For example, "Patent Document 4" can be applied to the noise suppression).

This noise suppression method is based on assumption that voices (for example, user's voices) to be collected are originated from the neighborhood of an input element for a voice input channel, and other noises are input to non-neighborhood regions, that is, to an input element for a channel for noise input. When it is assumed as an example that input elements for both channels are provided toward different directions from each other, voices to be collected are originated from the front of the input element for voice input channels, and other noises are input to an input element for channels for noise input from the back direction.

Conversely speaking, the state in which voices to be collected is input from the back is an object for detection of wrong voice input for the system. Then, using the sound-source-direction detection unit 28, a malfunction condition set to which conditions to detect voices from the back direction is added, and a response operation list may be applied to the input element of the channel for voice input. FIG. 13 is an explanatory drawing showing the malfunction condition set and a response operation lists. The malfunction condition set 4 and the response operation 4 are obtained by adding a malfunction condition element of "Back Speaking" to the malfunction condition set 1 and the response operation 1 which have been previously shown. When the condition of "Back Speaking" is satisfied, speaking for guidance of "Please, speak from the front because the noise canceler is working" is made, and speaking from the front is promoted to a user.

Whether the noise canceler is activated or not is controlled by the voice input unit 21, and the voice input unit 21 operates in such a way that, when the noise canceler is not executed, the malfunction condition set 1 and the response operation 1 are configured to be output to the condition selection unit 23 and the response selection unit 27, respectively, and, at execution, the malfunction condition set 4, and the response operation 4 are configured to be output to the unit 23, and the unit 27.

Moreover, there is considered an example in which a different response operation is caused when the malfunction condition element is satisfied. In the case of the malfunction condition set 4, a cause for detection of the shortage in the voice volume can be the directivity together with the use of the noise canceler. But when a speaker is in the vicinity of the side surface making 90 degrees from the front, the detection condition for the back speaking is not necessarily satisfied, and it is considered a state in which only a voice-volume shortage can be detected.

In such a situation, even when the detection condition for the back speaking is not satisfied, the guidance of "Please, speak from the front" is more effective than that of "Please, speak in the nearer vicinity". Thus, even in a case in which the same malfunction condition element is satisfied, there exists a case in which there is a different response operation, depending on the voice input method, and, using the response selection unit 27, a method in which the response operation is switched for each of the voice input method becomes effective.

The fourth example can be applied even to a noise suppression method controlling the directivity for the voice input method, using technologies of a microphone array and the like. In this case, a malfunction condition element is set according to the acute-angle directivity. In general, a directivity characteristic corresponding to a use method is assumed beforehand in a technique giving the directivity to a voice input.

For example, when the microphone array technique is used, based on the assumption that the acute angle of the directivity is within the right and left 30 degrees from an element for voice input, there is set a malfunction condition element of the "Directivity", by which it is detected that a voice input angle is larger than the right and left 30 degrees from the element front as shown in FIG. 14. When the above conditions are satisfied, guidance speaking of "Please, speak from the front because the microphone array is under working" is made.

Moreover, the forth example can be also applied to a voice-input interface which switches between the directional and the non-directional microphone for use (the directivity microphone is used at detection of "surrounding noise") according to surrounding noise situations. In this case, the malfunction condition element is set according to the acute angle of the directivity for a directivity microphone.

Then, there will be explained an example (fifth example) according to the fifth exemplary embodiment.

The fifth example uses a response operation list shown in FIG. 15, and the list is according to the voice recognition result and the detection result. Two response operation lists described in FIG. 15 correspond to the malfunction condition set 1 and the malfunction condition set 4, respectively. As for the voice recognition result, two kinds of examples of a recognition result of "Hello" and a recognition result "Nothing" will be explained. "Nothing" of the voice recognition result equal to rejection. Moreover, "Nothing" of the detection result indicates that there was no satisfied malfunction condition element.

When the voice recognition result is "Hello", the response unit 25 speaks "Hello", and, then, the guidance speaking corresponding to the detection result is made. Then, when the voice recognition result is "Nothing", the response unit 25 makes a corresponding guidance speaking when a satisfied malfunction condition element exists, and, when there is no element, no operation is executed for disregarding. In the same manner as the fourth example, the difference between the response operation list corresponding to the malfunction condition set 1 and the response operation list corresponding to the malfunction condition set 4 is a point that "Back Speaking" is added to the malfunction detection condition, and a point that a different guidance is made when the shortage in the voice volume is detected.

Moreover, even when the voice recognition result and the detection result are integrated, there is considered a case in which the response operations are different according to the state of the voice input unit 21. As shown in an example shown in the response operation in the parentheses at detection of the shortage in the voice volume for the malfunction condition set 4 in FIG. 15, there are considered a case in which the voice recognition result is "Hello", and, also, a case in which only the speaking for guidance is performed.

The above is a response operation, when it is assumed as a prerequisite that, while the voice input method of the malfunction condition set 4 is adopted, there is a condition that there is a low reliability in recognition of voices, for which the shortage in the voice volume is detected. Thus, when a certain malfunction condition element is satisfied by the voice input method, and when it is assumed that the reliability of the recognition result is reduced, there is considered no response to the result, and only the response operation for guidance even if a voice recognition result is obtained.

The above fifth example, which has been explained, can be applied to a system in which voice input is made in a real environment in which a surrounding noise is changed by the use environment and the use state. For example, there is considered application to a communication robot which installs a plurality of microphones, a noise canceler and a microphone array, or a sound-source separation technique is properly used according to the use environments, and speaking by a user is discriminated (voice recognition is made).

In this case, a voice signal input from the microphone installed in the robot is an input, the movement of a robot (for example, speaking for guidance is made, while nodding) is output from the response unit 25 for mounting. As a mounting mode, there is a method mounting the present system as the operation program of the robot. Moreover, assuming that the operation program of the robot is assumed to be the external application 30, and the voice input method, the malfunction condition set, or, a response operation is given to the voice input unit 21, the condition selection unit 23, and the response selection unit 27 for control.

INDUSTRIAL APPLICABILITY

The present invention can be applied to a use as a voice input system in which, in a system requiring the voice input, the voice input unit 21 is changed, especially, according to various conditions. Moreover, the present invention can be applied to a use of a character agent, and a robot, which require voice communications such as voice conversations.

The invention claimed is:
1. A voice input system comprising:
an input for receiving an input signal from external applications;
a voice input unit inputting a voice from one or more channels, and outputting a voice signal;
a condition storing unit storing a plurality of malfunction condition sets, each said malfunction condition set including a plurality of malfunction condition elements for detecting a voice input state;
a condition selection unit, executed by a processor, inputting a first selection signal from one of said external applications, by which a malfunction condition set is dynamically selected from said condition storing unit, to acquire a malfunction condition set corresponding to said first selection signal from said condition storing unit and to store therein said acquired malfunction condition set;
a voice input state detection unit, executed by the processor, analyzing voice signals from said voice input unit, to generate analysis results comprising results with respect to each of malfunction condition elements satisfied of the selected malfunction condition set, to collate said analysis results and said malfunction condition elements included in said malfunction condition set held in said condition selection unit, and to output the compared results as detection results; and
a response unit, executed by the processor, doing an operation processing according to said detection results based on the malfunction condition elements satisfied.

2. The voice input system as claimed in claim 1, wherein:
said voice input unit switches a voice-input control processing according to situations, and outputs a present voice input state to said condition selection unit as a second selection signal; and
said condition selection unit acquires a malfunction condition set corresponding to said second selection signal from said condition storing unit and stores therein said acquired malfunction condition set.

3. The voice input system as claimed in claim 2, wherein said voice input control processing comprises a voice input characteristic changing processing, or a post processing for an input voice.

4. The voice input system as claimed in claim 2, wherein said voice input control processing comprises a noise suppression processing to emphasize a target voice by suppressing voices, which are included in said voice signal, and comprise other than a target voice, based on said voice signal from one or more channels.

5. The voice input system as claimed in claim 1, further comprising:
a response storing unit storing an operation processing corresponding to said malfunction condition set stored in said condition storage unit; and
a response selection unit in which said first selection signal is input, said operation processing according to said first selection signal is selected from said response storing unit and stored therein.

6. The voice input system as claimed in claim 2, further comprising:
a response storing unit storing an operation processing corresponding to said malfunction condition set stored in said condition storage unit; and
a response selection unit by which said first or said second selection signal is input, and said operation processing according to said first or said second selection signal is selected from said response storing unit and stored therein.

7. The voice input system as claimed in claim 2, wherein said condition selection unit arbitrates between said first selection signal from said external application and said second selection signal from said voice input unit.

8. The voice input system as claimed in claim 1, further comprising:
a sound-source direction detection unit by which said voice signal is input, and the sound-source direction unit is calculated for output to said voice input state detection unit.

9. The voice input system as claimed in claim 1, further comprising:
a voice recognition unit by which said voice signal is input for a voice recognition processing, and the obtained voice recognition result is output to said response unit.

10. The voice input system as claimed in claim 9, wherein said voice recognition unit outputs said obtained voice recognition result to said response unit, and
data on feature quantities used for voice recognition is output to said voice input state detection unit.

11. An interactive-type robot including said voice input system according to a claim 1.

12. A voice input method executed by a processor, in a voice input system comprising a voice input unit, a condition storage unit storing a plurality of malfunction condition sets including a malfunction condition element for detecting of a voice input state, a condition selection unit, a voice input state detection unit, and a response unit, said method comprising:
inputting a voice from one or more channels into said voice input unit, and outputting a voice signal therefrom;
inputting a first selection signal from an external application into said condition selection unit, to dynamically select a malfunction condition set from said condition storing unit from among said plurality of malfunction condition sets, wherein each said malfunction condition set including a plurality of malfunction condition elements for detecting a voice input state;
acquiring said malfunction condition set according to said first selection signal from said condition storing unit and storing said acquired malfunction condition set in said condition selection unit;
analyzing said voice signal, in said voice input state detection unit, and generating therein an analysis result comprising results with respect to each of malfunction condition elements satisfied of the selected malfunction condition set, collating said analysis result, and outputting, as a detection result, the malfunction condition elements included in said malfunction condition set stored in said condition selection unit; and
performing, in said response unit, an operation processing according to said detection result based on the malfunction condition elements.

13. The voice input method as claimed in claim 12, further comprising:
switching, in said input unit, a voice input control processing according to situations, and outputting therefrom a present voice input state as a second selection signal to said condition selection unit; and
acquiring, by said condition selection unit, said malfunction condition set according to said second selection signal from said condition storing unit and storing said acquired malfunction condition set therein.

14. The voice input method as claimed in claim 13, wherein said voice input control processing comprises a voice input characteristic changing processing, or a post processing for the input voice.

15. The voice input method as claimed in claim 13, wherein said voice input control processing comprises a noise suppression processing by which a target voice is emphasized by suppressing voices which are included in said voice signal, and which comprises other than said target voice, based on said voice signals from one or more channels.

16. The voice input method as claimed in claim 12, wherein the voice input method is performed in the voice input system, the voice input system including a response selection unit and a response storing unit which stores said operation processing corresponding to said malfunction condition set stored in said condition storing unit, the method further comprising:
inputting said first selection signal into said response selection unit;
selecting, in said response selection unit, said operation processing from said response storing unit according to said first selection signal; and
storing the selected operation processing in said response selection unit.

17. The voice input method as claimed in claim 13, wherein the voice input method is to be performed in the voice input system, the voice input system including a response selection unit and a response storing unit which stores said operation processing corresponding to said malfunction condition set stored in said condition storing unit, said method further comprising:
inputting, into said selection unit, said first or second selection signal;

selecting said operation processing according to said first or second selection signal from said response storing unit; and storing the selected operation processing in said selection unit.

18. The voice input method as claimed in claim 13, further comprising arbitrating, in said condition selection unit, between said first selection signal from said external application and said second selection signal from said voice input unit.

19. The voice input method as claimed in claim 12, wherein said voice input system further comprises a sound-source direction detection unit, said method further comprising:

inputting, into said sound-source direction detection unit, said voice signal;

calculating, in said sound-source direction detection unit, a direction of a sound source; and outputting said calculated direction to said voice input state detection unit.

20. The voice input method as claimed in claim 12, wherein said voice input system further comprises a voice recognition unit, said method further comprising:

inputting, into said voice recognition unit said voice signal; and outputting, from said voice recognition unit, an obtained voice recognition result to said response unit.

21. The voice input method as claimed in claim 20, further comprising:

outputting, from said voice recognition unit, said obtained voice recognition result, to said response unit; and outputting, to said voice input state detection unit, data on feature quantities used for voice recognition.

22. A non-transitory, computer readable storage medium storing a voice input program, in a voice input system, the program executed by a processor, comprising:

a voice input unit;

a condition storage unit storing a plurality of malfunction condition sets including a malfunction condition element, wherein each said malfunction condition set including a plurality of malfunction condition elements for detecting a voice input state:

a condition selection unit;

a voice input state detection unit; and a response unit, wherein said voice input unit is configured by said voice input program to execute a procedure by which a voice is input from one or more channels, and a voice signal is output, said condition selection unit is configured by said voice input program to execute a procedure by which a first selection signal from an external application to dynamically select said malfunction condition set from said condition storing unit and said malfunction condition set corresponding to said first selection signal is acquired from said condition storing unit and stored, the voice input state detection unit is configured by said voice input program to execute a procedure by which said voice signal is analyzed comprising results with respect to each of malfunction condition elements satisfied of the selected malfunction condition set, and an analysis result is generated, said analysis result, and said malfunction condition element included in said malfunction condition set held by said condition selection unit are collated, and a detection result is output, and said response unit is configured by said voice input program to execute a procedure by which operation processing according to said detection result is performed based on the malfunction condition elements.

23. The storage medium as claimed in claim 22, wherein said voice input unit is configured to execute a procedure by which voice input control processing is switched according to situations, and the present voice input state is output to said condition selection unit as a second selection signal, and said condition selection unit is configured to execute a procedure by which said malfunction condition set corresponding to said second selection signal is acquired from said condition storing unit and stored.

24. The storage medium as claimed in claim 23, wherein said voice input control processing comprises a voice input characteristic changing processing, or a post processing for input voices.

25. The storage medium as claimed in claim 23, wherein said voice input control processing comprises a noise suppression processing by which a target voice is emphasized by suppressing voices which are included in said voice signal, and comprise other than a target voice, based on said voice signals from one or more channels.

26. The storage medium as claimed in claim 22, wherein the voice input program is to be performed in the voice input system, the voice input system including a response selection unit and a response storing unit which stores said operation processing corresponding to said malfunction condition set stored in said condition storing unit, and wherein the program makes the response selection unit execute processes of inputting said first selection signal, selecting said operation processing according to said first selection signal from said response storing unit, and storing the selected operation processing.

27. The storage medium as claimed in claim 23, wherein the voice input program is to be performed in the voice input system, the voice input system including a response selection unit and a response storing unit which stores said operation processing corresponding to said malfunction condition set stored in said condition storing unit, and wherein the voice input program makes said corresponding selection unit execute processes of inputting said first or second selection signal, selecting said operation processing according to said first or second selection signal from the corresponding storing unit, and storing the selected operation processing.

28. The storage medium as claimed in claim 23, wherein said condition selection unit is configured to execute a procedure for arbitration between said first selection signal from said external application, and said second selection signal from said voice input unit.

29. The storage medium in said voice input system further provided with a sound-source direction detection unit as claimed in claim 22, wherein said sound-source direction detection unit is configured to execute a procedure by which said voice signal is input, and the sound-source direction is calculated, and is output to said voice input state detection unit.

30. The storage medium as claimed in claim 22, in said voice input system further including a voice recognition unit, wherein said voice recognition unit is configured to execute a procedure by which said voice signal is input, voice recognition is processed, and the obtained voice recognition result is output to said response unit.

31. The storage medium as claimed in claim 30, wherein said voice recognition unit is configured to execute a procedure by which said obtained voice recognition result is output to said response unit, and data on feature quantities used for voice recognition is output to said voice input state detection unit.

* * * * *